United States Patent [19]
Devanathan et al.

[11] Patent Number: 5,624,642
[45] Date of Patent: Apr. 29, 1997

[54] HYDROCARBON PROCESSING APPARATUS

[75] Inventors: Narasimhan Devanathan, Aurora, Ill.; Craig A. McKnight, Sherwood Park, Canada; William B. VanderHeyden, Los Alamos, N.M.; Larry P. Hackman, St. Albert, Canada; Peter J. Klomans, Lockport, Ill.; Robert W. Skwarok, Edmonton, Canada

[73] Assignee: Amoco Corporation, Chicago, Ill.

[21] Appl. No.: 323,389

[22] Filed: Oct. 14, 1994

[51] Int. Cl.$^6$ .................... B01J 8/22; F27B 15/02; F27B 15/12

[52] U.S. Cl. .................... 422/140; 422/147; 55/398; 96/188

[58] Field of Search .................... 422/147, 187, 422/140; 96/193, 194, 195, 155, 188; 55/421, 398

[56] References Cited

U.S. PATENT DOCUMENTS

| | | | |
|---|---|---|---|
| 3,414,386 | 12/1968 | Mattix | 422/140 |
| 3,630,687 | 12/1971 | Van Driesen et al. | 422/140 |
| 3,668,116 | 6/1972 | Adams et al. | 208/216 |
| 3,693,324 | 9/1972 | McNeil | 96/195 |
| 4,012,314 | 3/1977 | Goldberger et al. | 208/251 |
| 4,151,073 | 4/1979 | Comolli | 208/340 |
| 4,221,653 | 9/1980 | Chervenak et al. | 208/8 |
| 4,294,593 | 10/1981 | Rehm | 96/195 |
| 4,354,852 | 10/1982 | Kydd | 95/1 |
| 4,804,458 | 2/1989 | Buttke et al. | 208/143 |
| 4,874,583 | 10/1989 | Colvert | 422/143 |
| 4,886,644 | 12/1989 | Chan et al. | 422/140 |
| 4,902,407 | 2/1990 | Chan et al. | 208/152 |
| 4,950,459 | 8/1990 | Buttke et al. | 422/220 |
| 5,066,467 | 11/1991 | Chan | 422/140 |
| 5,219,532 | 6/1993 | Buttke et al. | 422/140 |

Primary Examiner—Robert J. Warden
Assistant Examiner—Hien Tran
Attorney, Agent, or Firm—Scott P. McDonald; Robert A. Yesukevich; Richard A. Kretchmer

[57] ABSTRACT

Apparatus and methods useful for degassing a reaction mixture in a petrochemical processing reactor are disclosed. The methods and apparatus employ a novel liquid-gas separator that includes non-linear risers and that discharges the mixture into a vapor space in a manner intended to maximize degassing of the mixture. Resid hydrotreating processes employing these methods also are disclosed.

9 Claims, 10 Drawing Sheets

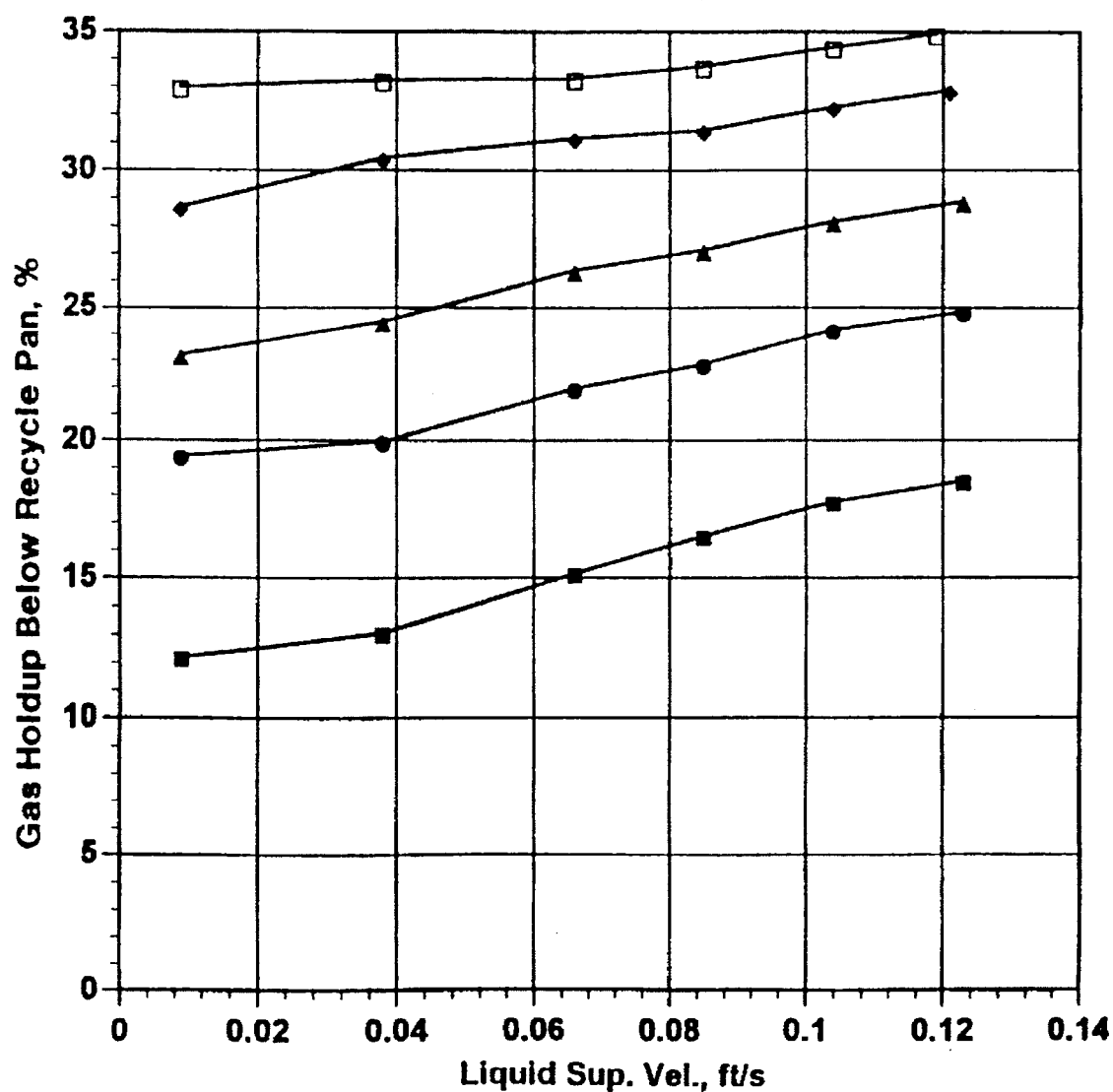

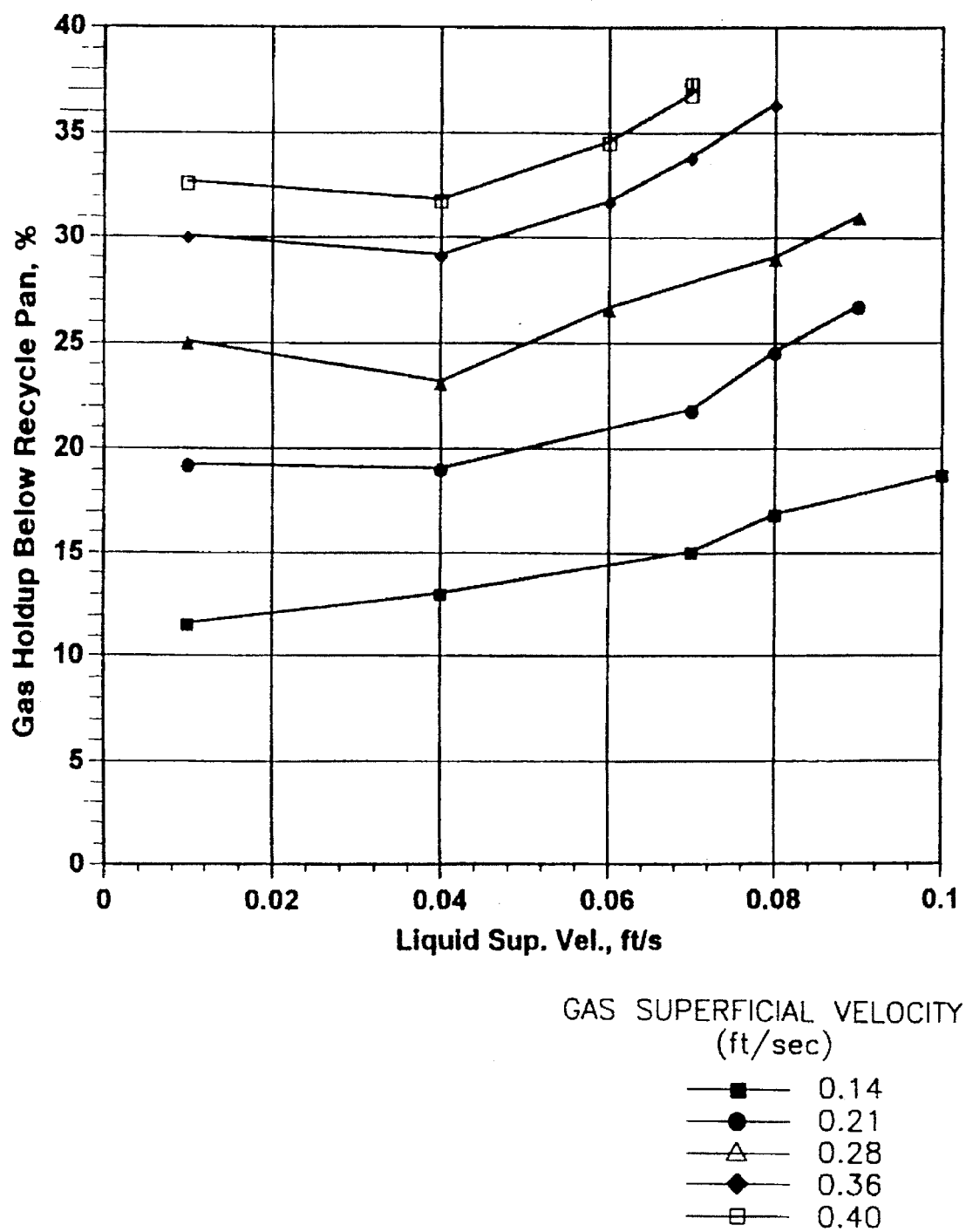

HYDROCARBON PROCESSING APPARATUS

FIELD OF THE INVENTION

This invention relates generally to the hydroprocessing of hydrocarbonaceous feedstocks, and more particularly to the use of certain liquid-gas separators in hydroconversion reactors used to process hydrocarbonaceous feedstocks.

BACKGROUND OF THE INVENTION

Modern reactors used to convert heavy hydrocarbonaceous feedstocks such as petroleum residuum ("resid") to lighter, more valuable products typically employ slurry-type or ebullated bed hydroconversion processes. Both slurry-type and ebullated bed hydroconversion processes routinely are conducted in the presence of hydrogen addition rates ranging from 500 to 5000 standard cubic feet of hydrogen per barrel ("SCF/bbl") of reacted feedstock.

Slurry hydroconversion processes usually react heavy feedstock in the presence of hydrogen and a colloidally-dispersed or feedstock-soluble catalyst or catalyst precursor. In these conversion processes, a large fraction of the reactor's liquid contents usually is recycled within the reactor during operation to provide good mixing. If hydrogen and other gases are not substantially removed from the liquid recycle stream prior to the stream's reintroduction into the reactor's reaction zone, the recycled gases reduce conversion by occupying reactor volume that otherwise would be occupied by feedstock. Therefore, hydrogen and other gases must be separated from recycle liquids prior to their reintroduction into the reactor's reaction zone.

Ebullated bed hydroconversion processes react heavy feedstock in the presence of hydrogen and an expanded bed of supported catalyst. Ebullated bed processes are three phase processes in which gases must be separated from a primarily catalyst-free liquid which is recycled within the reactor to provide sufficient liquid velocity for catalyst bed expansion. Recycle streams in ebullated bed reactors also must be degassed to maximize conversion.

Reactor gas volume often is minimized by employing some type of liquid-gas separator located in the upper region of a resid hydroconversion reactor. The separator typically separates liquids and gases immediately prior to the separated liquids being recirculated downwardly into the reactor vessel. Locating the separator near the top, discharge end of the reactor minimizes the residence time of separated gases in the reactor. In an ebullated bed reactor, the liquid-gas separator typically is located below a vapor space and above a freeboard or catalyst-free region of the reactor which itself is located above the expanded catalyst bed. Locating the separator above the expanded bed region minimizes separator wear from catalyst impingement as well as other difficulties that result from trying to separate solids and liquids from process gases.

Liquid-gas separators suitable for use in ebullated bed and slurry-type resid hydroconversion reactors frequently include linear riser devices which transfer fluid from a liquid reactor region to the reactor's vapor space. The risers typically penetrate or are located adjacent to a liquid recycle pan or plate located at the upper end of a recirculation downcomer used to collect and recirculate degassed process liquids toward the bottom of the reactor. Our U.S. Pat. Nos. 4,804,458; 4,950,459; and 5,219,532 are representative of such systems. These patents disclose systems in which a liquid recycle pan having an outer diameter less than the inner diameter of the reactor is penetrated by one or more linear riser pipes used to transport gases collected below the recycle pan directly to a vapor space located above the recycle pan. U.S. Pat. No. 3,414,386 similarly discloses a liquid-gas separator in which riser pipes penetrate or extend upwardly from a liquid recycle pan or plate that is fixed or moveably sealed to a reactor wall.

Other types of liquid-gas separators used in slurry-type or ebullated bed reactors include hydroclones or other vortex-creating structures located within or external to the reactor. For example, U.S. Pat. Nos. 4,886,644 and 5,066,467 to Chan teach the use of a liquid-gas separator incorporating helical members located within riser pipes to separate gas from a liquid-gas mixture. These designs discharge gas upwards out the hydroclone while discharging liquid downwards into the reactor. U.S. Pat. Nos. 3,668,116; 4,012,314; and 4,354,852, on the other hand, teach the use of liquid-gas separators located external to a reactor vessel. While the use of hydroclones can, in some cases, provide adequate gas disengagement from process liquids, hydroclone structures having narrow passageways can tend to plug during operation, particularly with heavy feedstocks such as resid. External separators are not favored because they complicate reactor design and require fluid pathways outside the reactor which can waste heat and reduce active reactor volume.

While the foregoing patents provide for many liquid-gas separator designs, the considerable economic incentive provided by efficient liquid-gas separation in ebullated bed and slurry-type resid hydroconversion reactors demands novel, more efficient separator designs.

SUMMARY OF THE INVENTION

Each aspect of the present invention is based on novel liquid-gas separation techniques. The methods and apparatus disclosed in this application exploit our discovery that liquid-gas separation in a slurry-type or ebullated bed reactor can be improved by using liquid-gas separation systems that transfer gas-bearing liquids to a reactor vapor space from a liquid reactor region through one or more non-linear conduits or "risers" constructed and oriented to enhance gas disengagement from a liquid-gas mixture. As used herein, the term "non-linear riser" refers to risers or other liquid transfer conduits whose shape causes a change in the direction of flow of gas-bearing liquid moving therethrough.

In a first aspect of the invention, a liquid-gas separator is provided for use in a reactor vessel used to react a liquid petrochemical feedstock in the presence of a process gas such as hydrogen. The separator includes a recycle pan or similar device located above a liquid reactor region and below a reactor vapor space. The pan has its periphery circumferentially joined to the reactor vessel. Penetrating the pan are one or more non-linear risers used for directing a mixture of reacted feedstock and process gas from the liquid region through the recycle pan and into the vapor space, thereby degassing the mixture and causing a degassed liquid to accumulate immediately above the recycle pan. The separator also includes a downcomer structure for transporting degassed liquid downwards into the liquid reactor region.

The separator preferentially directs gas into the vapor space through non-linear risers which gradually or abruptly change direction at least one time and which discharge the mixture tangentially toward a reactor vessel wall. Both the directional flow changes and the riser orientation improve gas disengagement which in turn results in less gas volume in recycled liquid. This decreased gas volume increases effective reactor volume which in turn increases feedstock conversion.

In a second aspect of the invention, a method is provided for degassing a mixture of gases and liquids produced in a petrochemical reactor to prepare a degassed liquid recycle stream suitable for reintroducing into a liquid reactor region. The method includes the steps of forcing the mixture from the liquid reactor region through a plurality of non-linear paths into a vapor space located above the liquid reactor region to disengage gases from the mixture; collecting degassed liquids from the vapor space and returning them through a downcomer into the liquid reactor region while preventing substantial upward flow of mixture into the vapor space through other than the non-linear paths; and preventing substantial downward flow of degassed liquids into the liquid reactor region through any path other than through the downcomer.

In yet another aspect of the invention, a method is disclosed for hydrotreating a resid feedstock in a resid hydrotreating reactor vessel having a liquid reaction zone and a vapor disengagement space located over the liquid zone. The method includes the steps of reacting a mixture of hydrogen, a degassed liquid recycle stream, and a catalyst in the liquid zone; forcing mixture from the liquid zone through a plurality of non-linear paths into the vapor disengagement space; collecting degassed liquids from the vapor space and returning the liquids to the liquid zone through a recycle structure located within the reactor vessel; preventing substantial upward flow of mixture into the vapor space through other than the non-linear paths; and preventing substantial downward flow of degassed liquids into the liquid reactor region through any path other than through the recycle structure.

BRIEF DESCRIPTION OF THE DRAWINGS

FIG. 10 depicts gas holdup and liquid superficial velocity at a variety of gas addition rates in a reactor region immediately below the recycle pan of a cold flow pilot plant reactor employing a liquid-gas separator in accordance with the present invention; and FIG. 11 depicts gas holdup and liquid superficial velocity at a variety of gas addition rates in a reactor region immediately below the recycle pan for a cold flow pilot plant reactor employing a two-stage prior art liquid-gas separator of the type shown in FIG. 5.

DETAILED DESCRIPTION OF THE INVENTION

Figure 5:
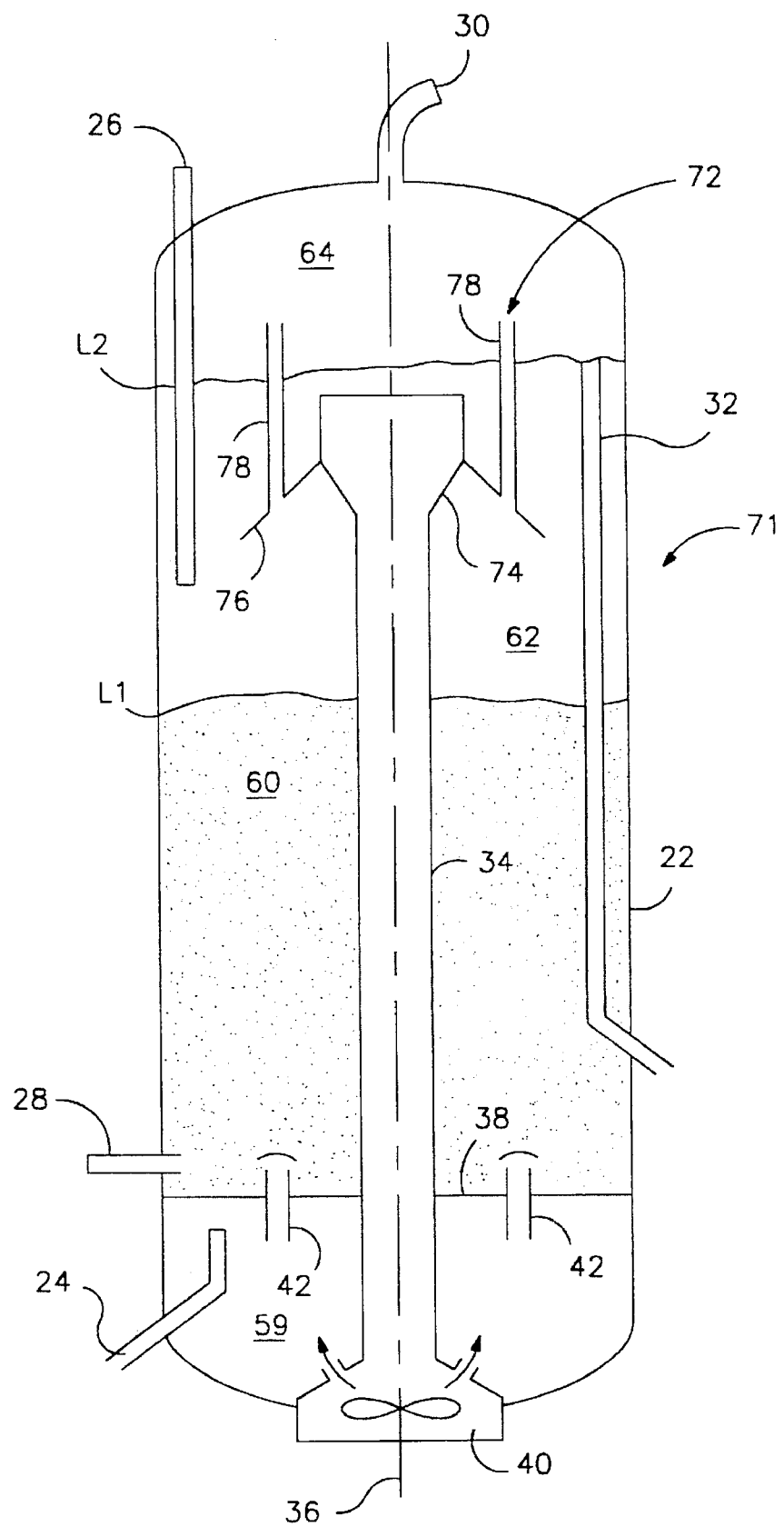
FIG. 5 is a simplified elevational view of a cross-section of a resid hydrotreating reactor employing two-stage prior art separator.

Each of the separator designs and processes discussed herein can provide improved liquid-gas separation in a slurry-type or ebullated bed resid hydrotreating reactor or other chemical reactor, particularly when compared to prior art separators of the type shown in FIG. 5 herein. While the separators and processes are discussed in the context of an ebullated bed resid hydrotreating reactor, the designs are especially applicable to any slurry-type or ebullated bed reactor which is used to convert a relatively heavy feedstock to a lighter product in the presence of an added process gas such as hydrogen.

Figure 1:
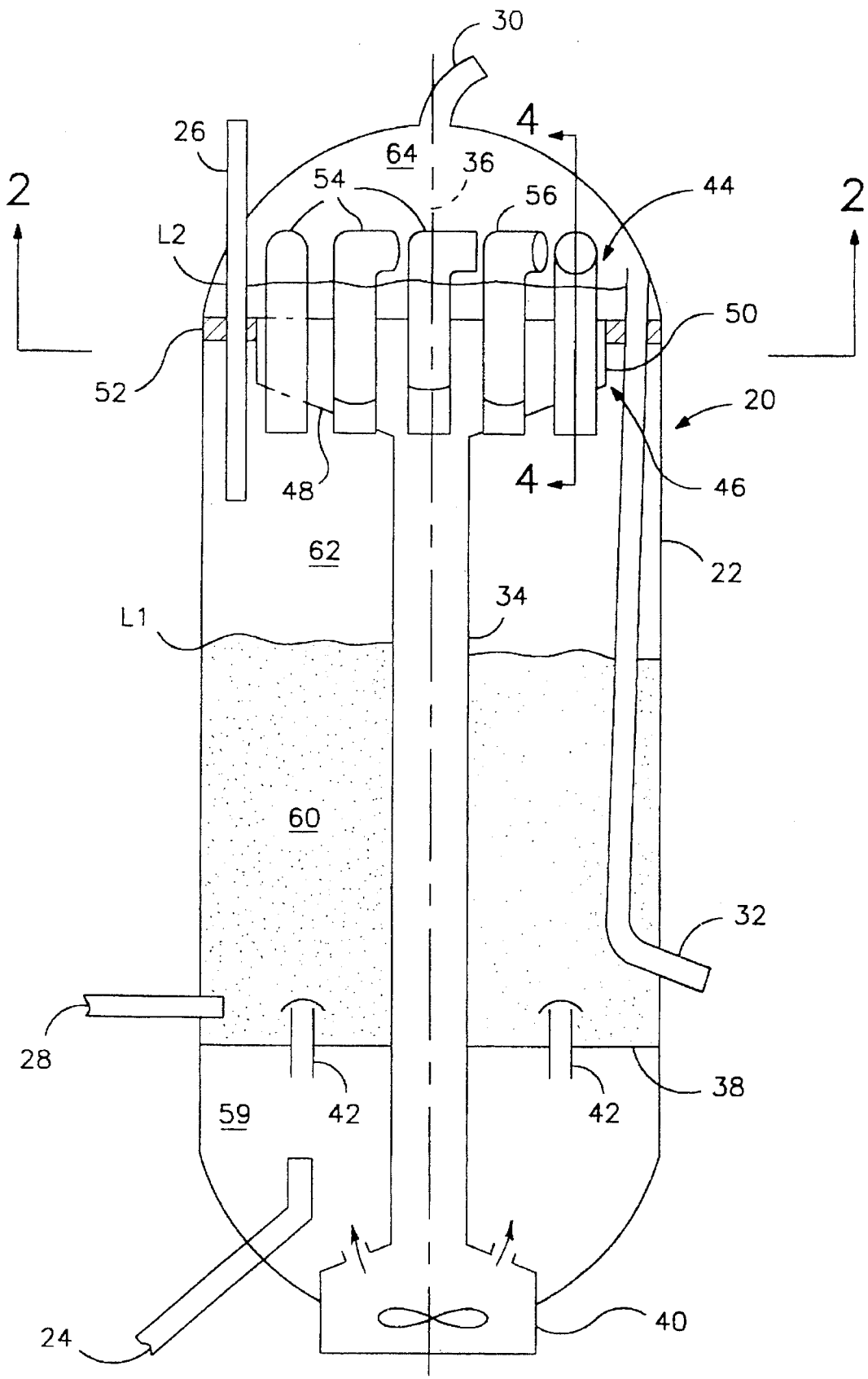
FIG. 1 is a simplified elevational view of a cross-section of a resid hydrotreating reactor incorporating a liquid-gas separator in accordance with the present invention.

Turning to FIG. 1, an ebullated bed hydrotreating reactor 20 includes a reactor vessel 22 penetrated by a feedstock and hydrogen inlet 24, a catalyst inlet 26, a catalyst outlet 28, a vapor outlet 30, and a liquid product outlet 32. Vapor outlet 30 is an optional component. If a reactor lacks a vapor outlet 30, both vapor and liquid may be withdrawn through a product outlet such as liquid product outlet 32.

Internal to vessel 22 is a recirculation downcomer 34 located along an axis of radial symmetry 36 of vessel 22. Downcomer 34 extends downwards through a distributor plate 38 and terminates into an ebullation or recirculation pump 40 located at the lower end of downcomer 34. Distributor plate 38 includes a plurality of bubble-capped risers 42.

A liquid-gas separator 44 in accordance with the present invention is attached to downcomer 34 at downcomer 34's upper end. Separator 44 includes a recycle pan 46 having a lower conical portion 48 attached to downcomer 34 at portion 48's lower end and an upper, generally cylindrical portion 50 circumferentially welded or otherwise attached to vessel 22 in such a manner as to substantially prevent the flow of liquid between horizontal pan upper portion 50 and an abutting wall 52 of vessel 22. It is preferred for conical portion 48 to be relatively shallow or flat, although if extremely shallow or flat, sludge may undesirably accumulate in pan 46.

Separator 44 also includes a plurality of non-linear risers 54 which pass upwards through conical pan portion 48. Risers 54 include elbow portions or curved portions 56 and vertical riser portions 58. Elbow portions 56 preferably include an angle of about 45° to 135°, more preferably 60° and 120°, and most preferably about 90°. The linear portion 58 is integral with the curved portion 56.

During operation, feedstock and hydrogen are added to reactor 22 through inlet 24 and are forced upwards through bubble-capped risers 42 along with recirculated reactor liquids drawn downwards through downcomer 34 by ebullation pump 40 into a liquid mixing region 59. The upward liquid velocity of fluids forced through risers 42 expands a bed of supported catalyst to level L1, creating a catalyst-containing liquid region 60 in which feedstock and recirculated liquids are catalytically upgraded to lighter, more valuable products.

A freeboard or catalyst-free liquid region 62 exists between level L1 and an upper liquid level L2. Freeboard region 62 is generally catalyst-free because the liquid superficial velocity of fluids introduced through distributor plate 38 is insufficient to expand catalyst-containing zone 60 above level L1.

The liquids present in freeboard region 62 contain substantial amounts of hydrogen and other gases. If these gases are not efficiently removed from the liquids, the gases will occupy reactor volume that otherwise would be available to liquids. Removing these gases results in increased conversion of feedstock to product. To affect such a separation, non-linear risers 54 direct catalyst-free reaction mixture from freeboard region 62 first through vertical riser portion 58 and then through elbow portion 56 into a reactor vapor space 64. Risers 54 are non-linear and preferably elbowed as shown to assist the disengagement of gases from liquids as the liquids pass through risers 54 and into vapor space 64. The upper ends of risers 54 are oriented as described in detail in connection with FIGS. 2 through 4 to maximize the separation of gases from the reaction mixture entering vapor space 64. Separated gases and other vapors are withdrawn from reactor 20 through vapor outlet 30. Degassed liquids accumulate at the bottom of vapor space 64 to level L2 and are drawn downwards in reactor 20 by the combined action of downcomer 34 and recirculation pump 40.

Proper operation of separator 44 requires that any gap between pan 46 and wall 52 is small enough to substantially prevent flow from region 62 into vapor space 64. As used herein, the term "substantially prevent" means to limit flow through non-preferred paths between region 62 and vapor space 64 in a given direction to less than 40 percent of the total horizontal cross-sectional area of preferred and non-preferred paths in the given direction. For example, where liquid can pass upwardly through both risers 54 and an annular gap between pan 46 and wall 52 during operation, the cross-sectional area of risers 54 will be at least 60% of the total riser and gap area. Similarly, if paths permitting the downward flow of liquid besides downcomer 34 exist in the reactor, the cross-sectional area of downcomer 34 will be at least 60% of the total cross-sectional area of downward flowpaths. To limit upward flow through non-riser paths, horizontal pan portion 50 preferably is welded to abutting wall 52 of vessel 22 around portion 50's entire periphery to seal pan portion 50 to wall 52. It is also preferred that pan 46 be substantially free of any apertures or other flowpaths that might allow liquid to pass into vapor space 64 other than through risers 54.

Figure 2:
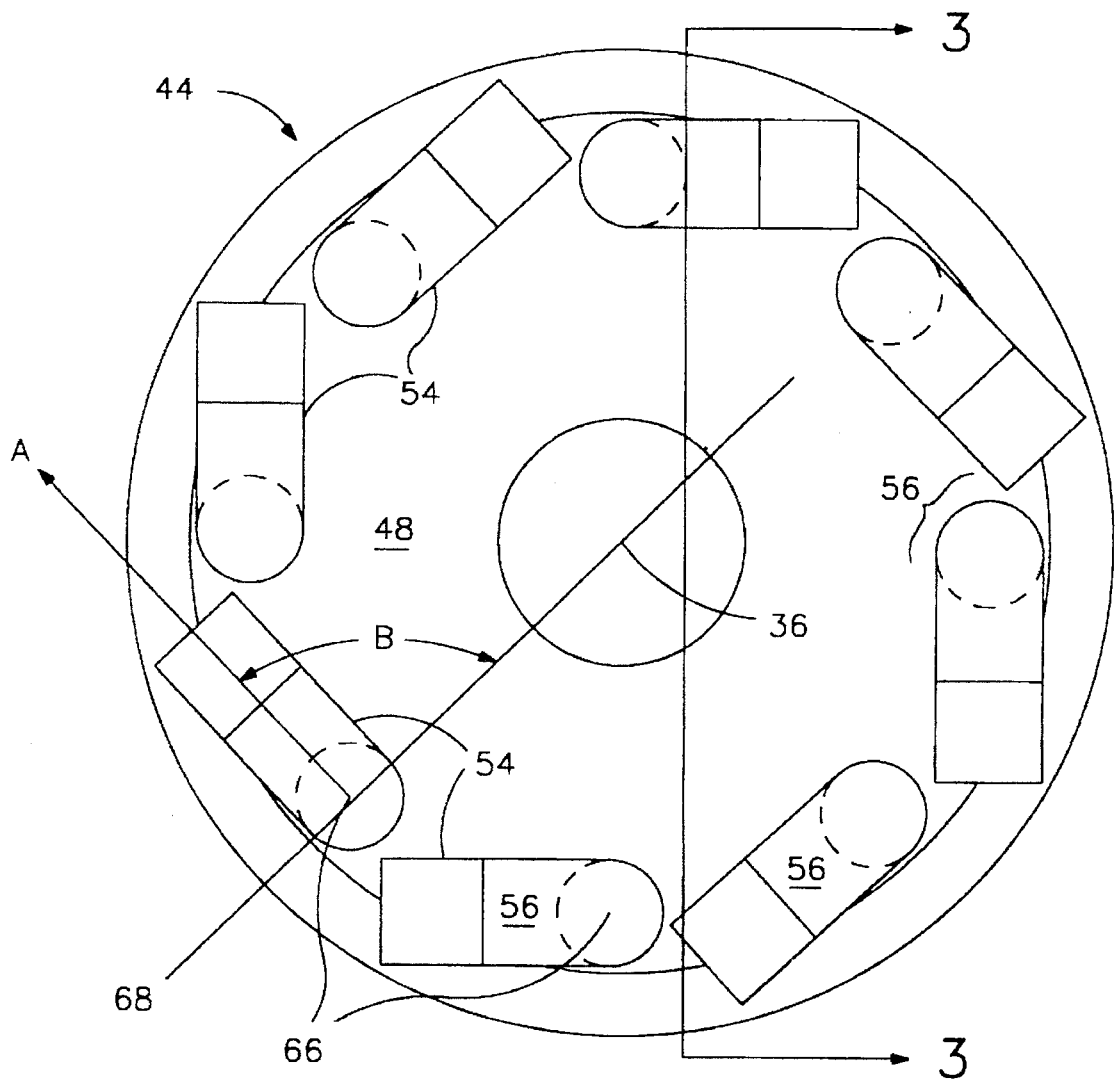
FIG. 2 is a top plan view of the separator shown in FIG. 1 taken along line 2—2 of FIG. 1.
Figure 3:
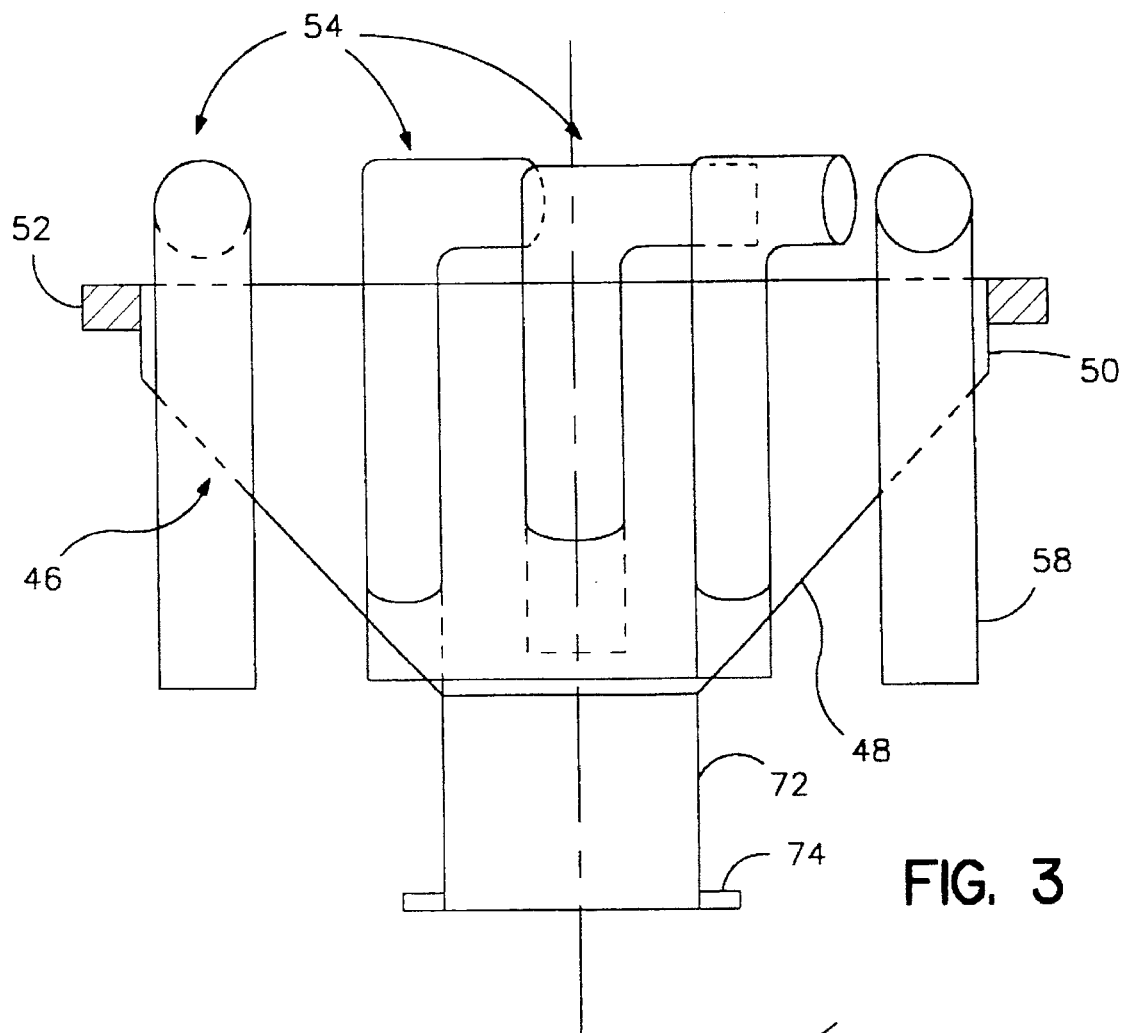
FIG. 3 is a sectional elevational view of the separator shown in FIG. 2 taken along line 3—3 of FIG. 2.
Figure 4:
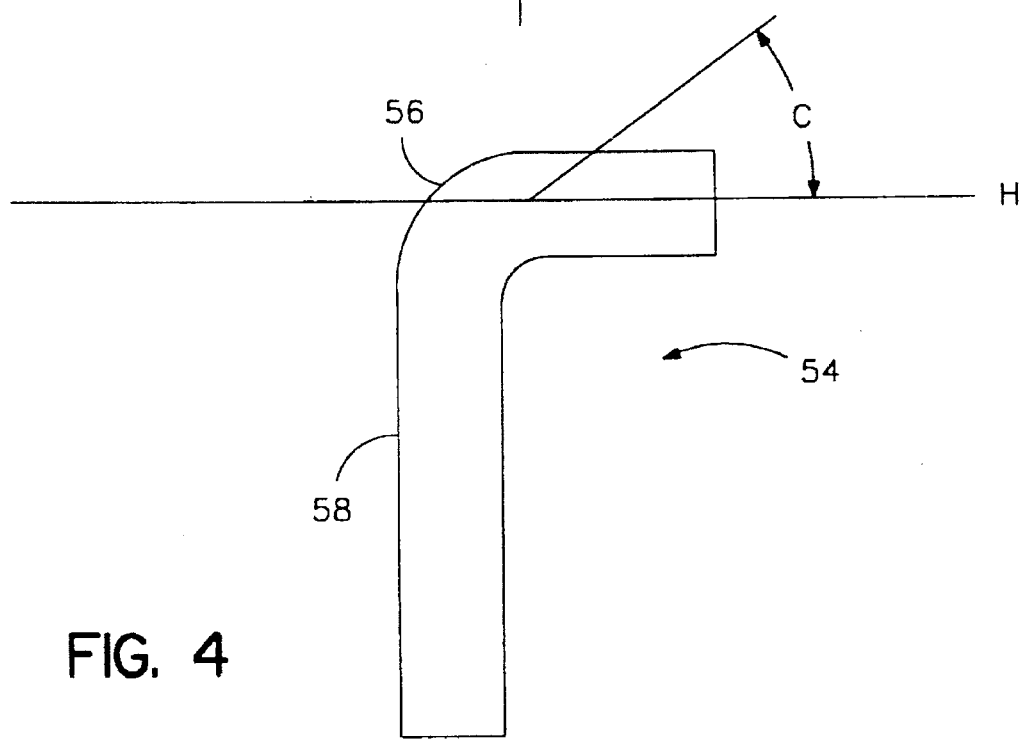
FIG. 4 is an elevational view of a non-linear riser taken along line 4—4 of FIG. 1.

Referring now to FIGS. 2, 3 and 4, separator 44 includes eight elbowed, non-linear risers 54 symmetrically located in conical pan portion 48 about radial axis of symmetry 36. Each riser 54 includes elbow portion 56 connected to linear portion or vertical riser portion 58. Elbow portion 56 preferably redirects liquid reaction mixture within riser 54 from a generally vertical flow to a generally horizontal flow in a tangential direction as indicated in FIG. 2.

Risers 54 each have a vertical axis of symmetry 66 parallel to axis 36. The riser vertical axis of symmetry is defined as a line parallel to the reactor axis of vertical symmetry 36 which passes through the horizontal plane intersecting the center of risers 54 where risers 54 pass through recycle pan 46. Elbow portions 56 generally direct liquid reaction mixture in a direction A at an included horizontal angle B from a line 68 intersecting axes of symmetry 36 and 66. Direction A most preferably is tangential to reactor vessel wall 52 when viewed from above as in FIG. 2. Although tangential orientation is preferred, other preferred angles B range from 60° to 180°, and more preferably between 75° and 105°, with greater and lesser angles being useable. It is preferred that risers 54 be oriented so that exiting material does not impact directly on another riser 54.

If angle B is approximately 90°, the liquid will strike the wall tangentially, which may induce a cyclonic effect in vapor space 64 which may have a beneficial liquid-gas separation effect. If this additional effect is desired, vapor outlet 30 should be located along axis of symmetry 36. Angle B should not be selected to direct liquid toward axis of symmetry 36 as it is believed that liquid gas separation will be adversely affected. It should be noted that the use of the word "tangential" in this application refers to horizontal angle B as shown in FIG. 2, without regard for variations in a vertical angle C described below in conjunction with FIG. 4.

The total internal cross-sectional area of risers 54 preferably is between about 4 and 12 percent of the horizontal reactor cross-section through which risers 54 pass. More preferably, the cross-sectional area of riser 54 is about 5 to 10 percent of the cross-section through which risers 54 pass. For a given cross-sectional area, a larger number of smaller diameter risers is preferred. The number of risers 54 used should be about 4 to 16, and most preferably about 8 to 12.

Referring now to FIG. 3 specifically, linear riser portion 58 extends about to the bottom of conical portion 48 of a recycle pan 46. The length of portion 58 extending below pan 46 is not critical but in most cases, shorter risers are preferred over larger risers. Portion 58 must not extend below freeboard region 62 in an ebullated bed system as the introduction of catalyst into vapor space 64 will result in catalyst being recirculated through ebullation pump 40, causing damage to pump 40. As shown in FIG. 3, pan 46 also includes an optional lower cylindrical pan portion 72 including a flange 74 for mating pan 46 with downcomer 34.

Riser 54 preferably directs liquid reaction mixture horizontally and tangentially towards wall 52 (see FIG. 2), most preferably at an angle C of about 0° from a horizontal plane H defined by a horizontal cross-section of reactor 22 as shown in FIG. 4. Angles C near 0° are most preferred, with angles up to ±15° being preferred, although other angles may be used. It is preferred that risers 54 extend no further above pan 46 than required to maintain the outlet end of risers 54 above the level of degassed liquid present in pan 46.

If desired, the velocity of the liquid-gas mixture exiting risers 54 may be altered by narrowing or widening the outlet portion of risers 54. Also, the exiting of mixture from the outlet end of riser 54 may be further controlled by including vanes or other structures within or immediately adjacent to the outlet end of risers 54 to swirl or otherwise alter the flow of the exiting mixture.

Non-linear risers 54 can be fabricated from any material capable of withstanding long-term operation under the selected reactor operating conditions. Typically, risers 54 will be most easily prepared by welding stainless steel pipes and elbows together. Stiffening plates or support brackets may be desirable in the region where risers 54 penetrate pan 46.

FIG. 5 depicts a resid hydrotreating reactor 71 substantially like the reactor depicted in FIG. 1 but fitted with a prior art two-stage liquid-gas separator whose performance is compared to the invention in FIGS. 6–9. FIG. 5 is substantially identical to FIG. 1 except that it employs a "two-stage" liquid-gas separator 72 of the type disclosed in our U.S. Pat.

No. 4,804,458 to Buttke. Separator 72 includes a recycle pan 74 connected to downcomer 34. Extending downwards from the periphery of pan 74 is a frustoconical skirt 76 extending towards but not in contact with reactor vessel 22. Penetrating skirt 76 are a plurality of linear risers 78. During operation, gas bubbles collect within skirt 76 and travel directly through risers 78 into vapor space 64.

As can be seen by comparing FIGS. 1 and 5, the two-stage design differs from the present invention in that pan 74 and skirt 76 are not sealed to reactor vessel 22 at their periphery as is pan 46 in FIG. 1. Additionally, risers 78 are linear rather than non-linear as are risers 54 in FIG. 1. The configuration of FIG. 1 is believed to be superior to the configuration in FIG. 5 for at least three reasons. First, a quiescent separation zone is created by isolating the separation zone from the body of the reactor by sealing the pan to the reactor wall. Secondly, because fluid is not discharged vertically to the vapor space and allowed to fall downwards through the vapor space, reentrainment of gaseous discharged fluid is minimized. Third, the reactor of a cyclonic flow in vapor space 64 can enhance liquid-gas separation in the vapor space.

The superiority of the invention shown in FIG. 1 to the two-stage design shown in FIG. 5 has been demonstrated in our cold flow pilot plant. The pilot plant consists of a scale model of a single reactor of the type illustrated in FIGS. 1 and 5. In the pilot plant, nitrogen and kerosene are used to model the behavior of hydrogen and oil in a resid hydrotreating unit.

Figure 6:
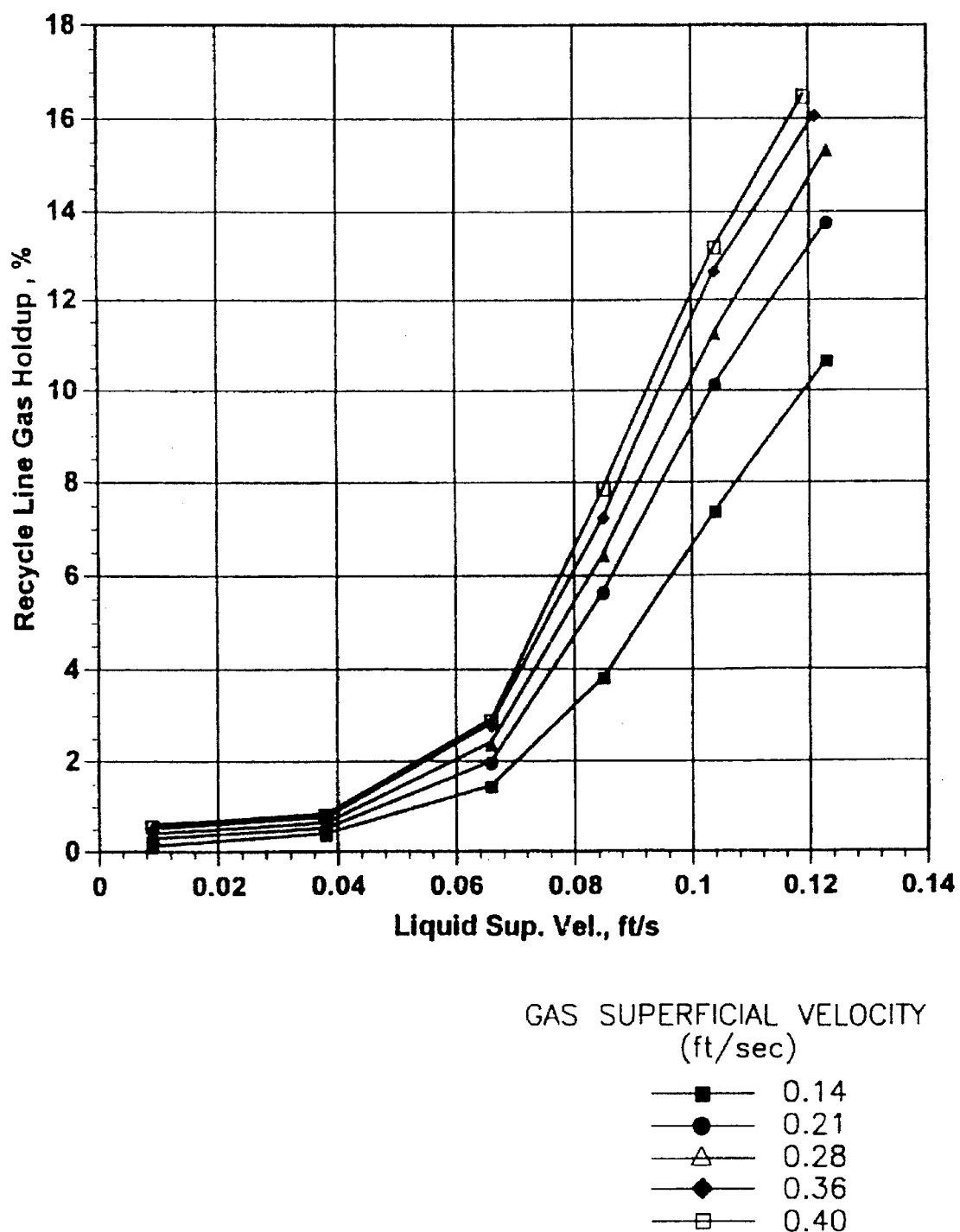
FIG. 6 depicts average recycle line gas holdup and liquid superficial velocity at a variety of gas addition rates for a cold flow pilot plant reactor employing a liquid-gas separator in accordance with the present invention.
Figure 7:
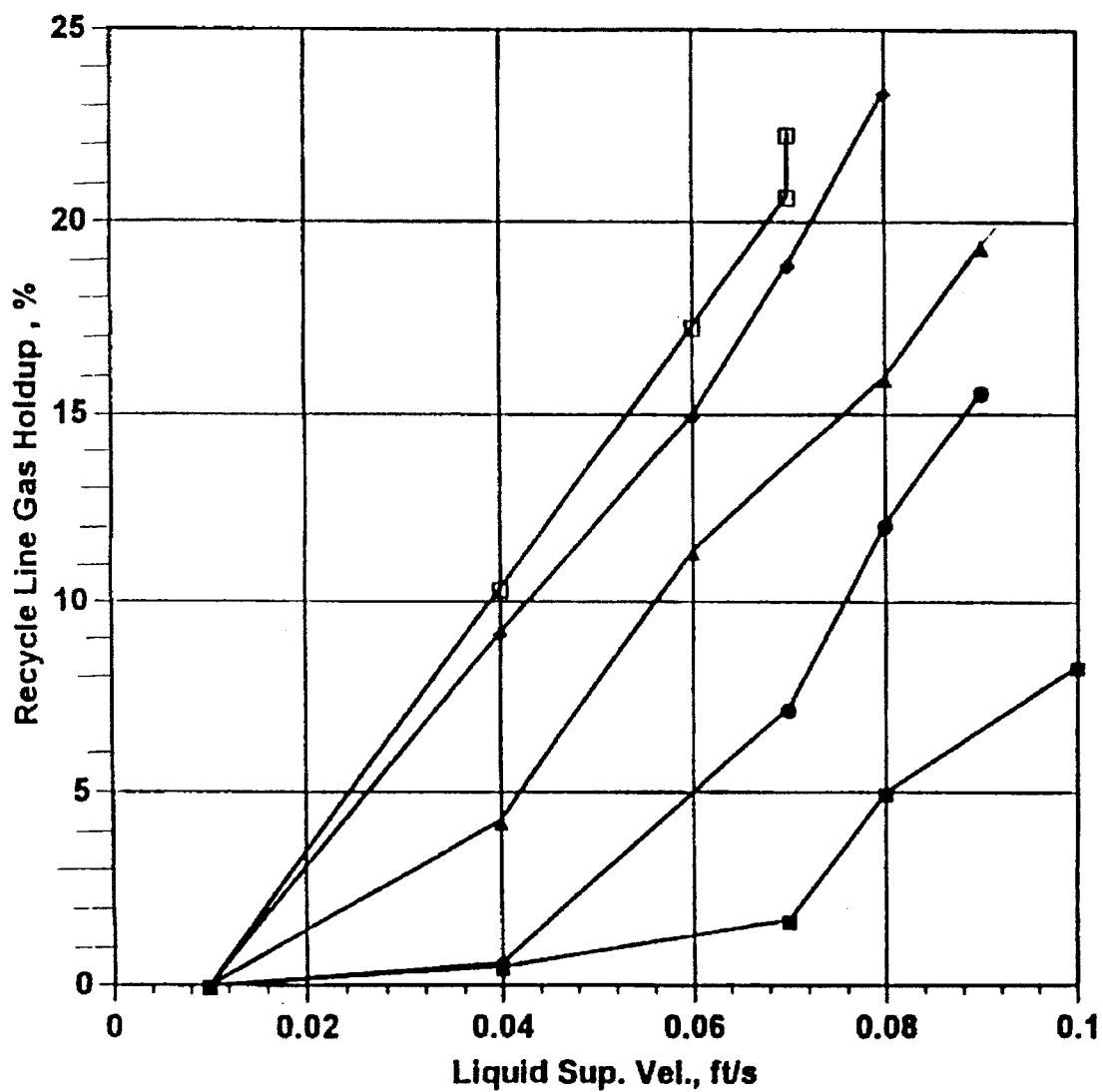
FIG. 7 depicts average recycle line gas holdup and liquid superficial velocity at a variety of gas addition rates for a cold flow pilot plant reactor employing a two-stage prior art liquid-gas separator of the type shown in FIG. 5.

FIGS. 6 and 7 compare the recycle downcomer gas holdup percent for the invention and the two-stage design over a wide range of superficial liquid velocities and gas addition rates, and show that the invention provides marked reductions in recycle line gas holdup rates. The data for FIGS. 6 and 7 was obtained by taking differential pressure measurements across the entire length of the reactor downcomer, and the data therefore represents average downcomer gas holdup percent.

Figure 8:
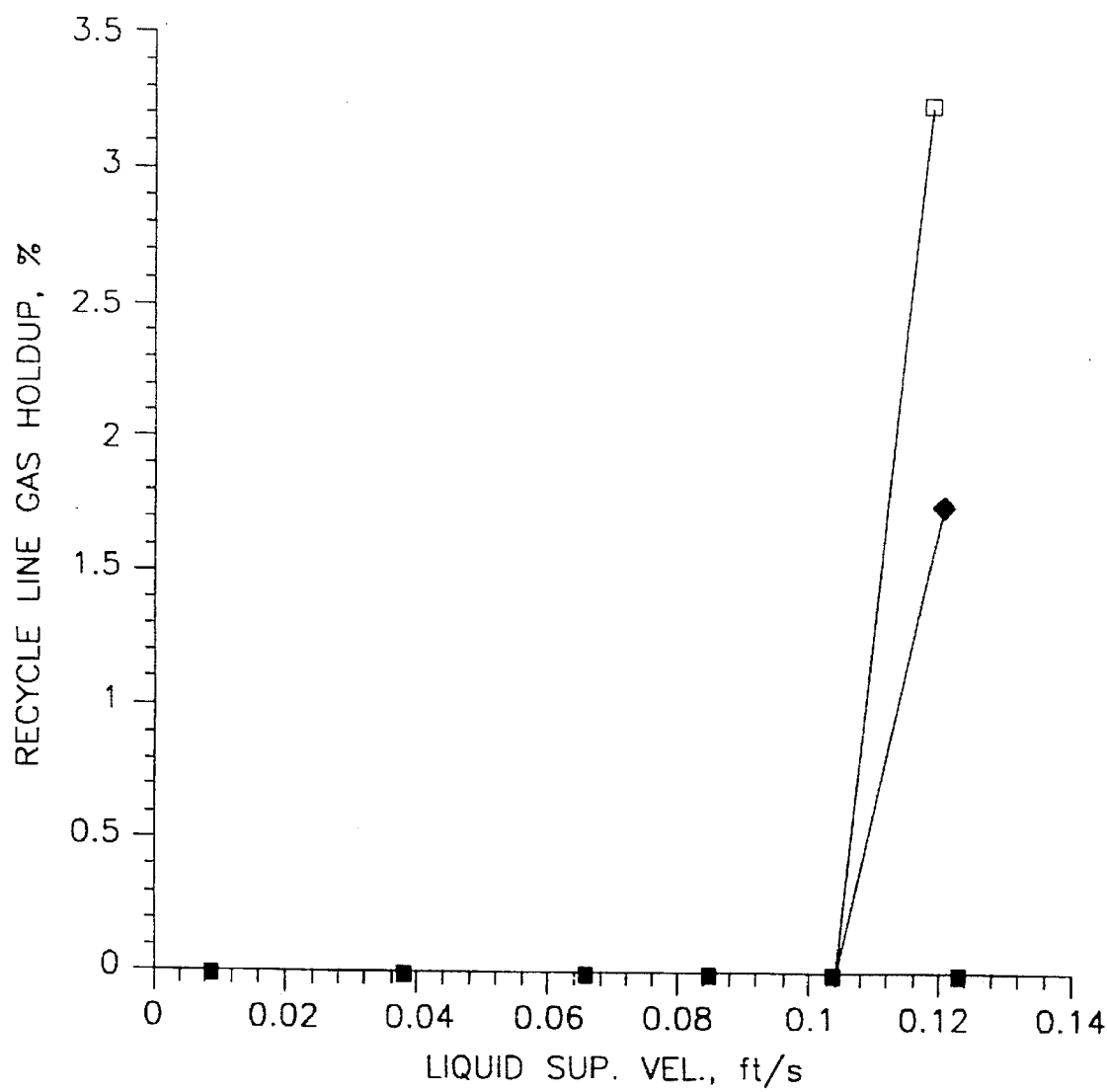
FIG. 8 depicts recycle line gas holdup and liquid superficial velocity at a variety of gas addition rates at a location immediately upstream of the location where recycled liquid is reintroduced into a cold flow pilot plant reactor employing a liquid gas separator in accordance with the present invention.
Figure 9:
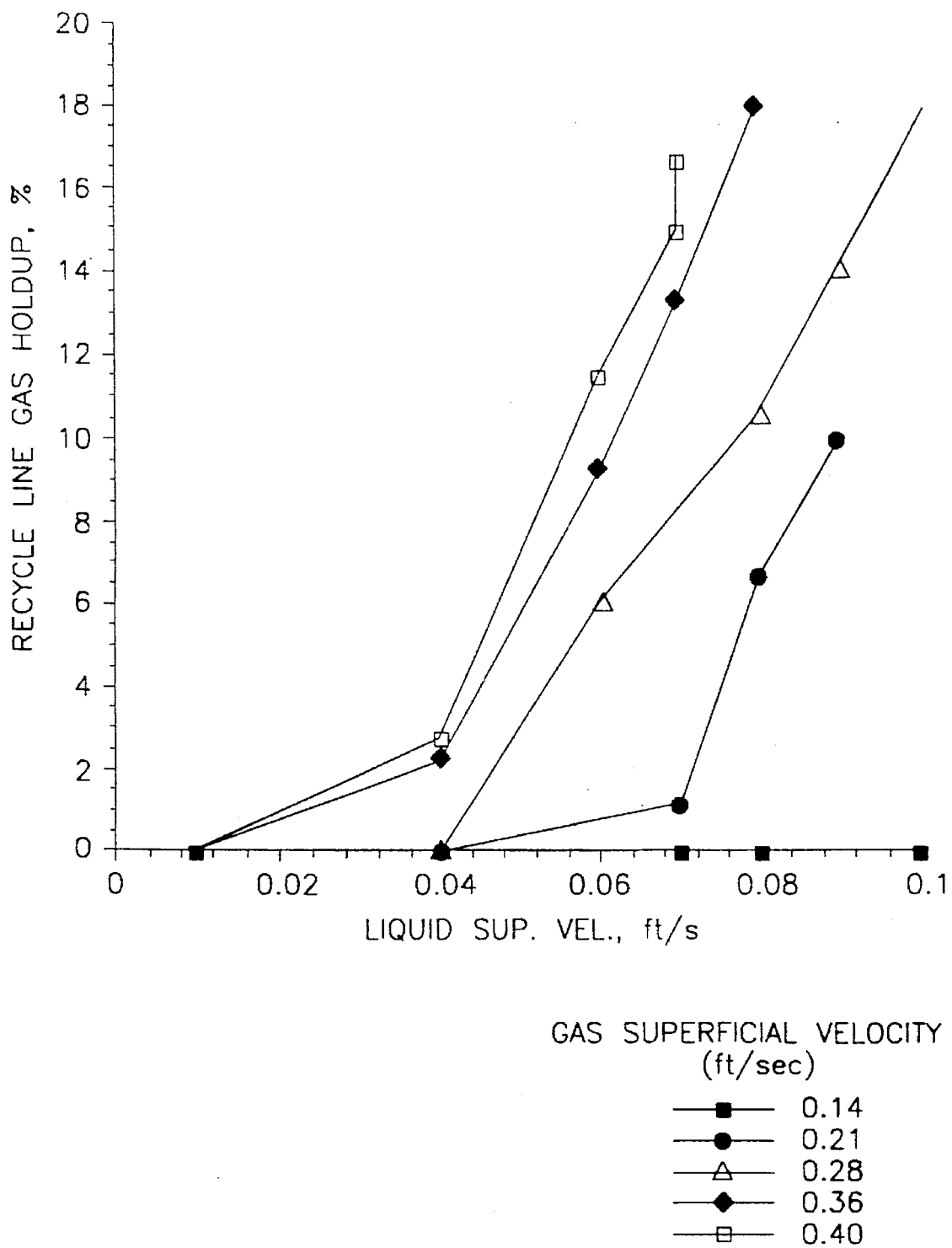
FIG. 9 depicts recycle line gas holdup and liquid superficial velocity at a variety of gas addition rates at a location immediately upstream of the location where recycled liquid is reintroduced into a cold flow pilot plant reactor employing a two-stage prior art liquid-gas separator of the type shown in FIG. 5.

FIGS. 8 and 9 represent recycle line gas holdup percent at a location just upstream of the location where the recycle stream is remixed in the reactor. These measurements were taken with a neutron densitometer. As can be seen by comparing FIGS. 8 and 9, recycle gas holdup is dramatically reduced by the invention.

FIGS. 10 and 11 compare gas holdup rates in a zone extending from immediately below the recycle pan to about 4 feet below the recycle pan. The data in FIGS. 10 and 11 was obtained by taking differential pressure measurements across the 4 foot zone, and the data again confirms that the invention provides superior performance to the two-stage design, particularly at high liquid superficial velocity rates.

Separators of the type discussed above can be used to facilitate the hydroconversion of virtually any relatively heavy hydrocarbonaceous feedstock to a relatively lighter product. Suitable feedstocks can be derived from naturally-occurring materials such as petroleum, coal, tar sands, and oil shales as well as waste plastics and waste streams from various petrochemical processes. Operating conditions generally should be at pressures from atmospheric to about 8000 psi, at hydrogen partial pressures ranging from 10 to 100 percent of the total pressure, and at temperatures ranging from about 200° to 1200° F.

Catalysts suitable for use in the hydroconversion processes include colloidal metals or metal containing solids, as well as supported and oil-soluble catalysts. Suitable supported catalysts typically will comprise a hydrogenation metal such as nickel or cobalt and one or more promoters such as molybdenum which are deposited on a porous, refractory, inorganic oxide support. Suitable oil-soluble catalysts include virtually any organic metal containing compound soluble in the feedstock which contains a hydrogenation metal. Preferred soluble catalysts include organophosphorodithioate compounds such as the lubricant Molyvan L available from the Vanderbilt Chemical Company of Norwalk, Conn. If an oil-soluble catalyst is used, the catalyst may be added directly to the reactor or mixed with the feedstock at a location immediately upstream of the reactor. If a soluble or colloidal catalyst is used, sufficient catalyst should be added to provide a molybdenum metal concentration in the feedstock/catalyst mixture of between about 20 and 1000 parts per million. If a supported catalyst is used, catalyst should be added in an amount of 0.1–0.5 lb/bbl of feedstock.

Oil-soluble catalysts in accordance with the present invention are particularly well-suited to catalyzing the conversion of petroleum resids to lighter, more valuable products. As used in this application, the term "petroleum resid" or "resid" refers to feedstocks containing at least 50 weight percent of material boiling above about 650° F. at atmospheric pressure without regard for whether the feedstock is the product of a distillation process. Typically, resid will contain at least seventy weight percent of material boiling above about 1000° F. at atmospheric pressure and will be the bottoms product from one or more atmospheric or vacuum distillations.

When the feedstock is atmospheric or vacuum petroleum resid, the conversion preferably occurs in the presence of hydrogen gas at total pressures between about 200 and 8000 psi, at hydrogen partial pressures ranging from 20 to 95 percent of the total pressure, and at temperatures ranging from about 200° to 1200° F. More preferably, the conversion occurs at total pressures between about 1000 and 3000 psi at hydrogen partial pressures ranging from 20 to 95 percent of the total pressure and at temperatures between about 500° and 1000° F. Most preferably, the conversion occurs at total pressures between about 1500 and 2700 psi, at hydrogen partial pressures ranging from 50 to 95 percent of the total pressure and at temperatures between about 700° and 900° F. If a soluble or colloidal catalyst is used, catalyst concentration in the resid feedstock should be such as to provide between about 20 to 800 parts per million of molybdenum metal in the catalyst/resid mixture, and preferably between about 15 and 100 parts per million of molybdenum metal in the resid/feedstock mixture. If a supported catalyst is used, catalyst should be added in an amount of 0.2–0.4 lb/bbl of feedstock.

Many modifications can be made to the the apparatus and processes described above without departing from the spirit of the invention. For example, the number of risers can be varied, as well as their orientation and the degree and type of curvatures or bends contained therein. Most, if not all, benefits of the invention will be obtained as long as the recycle pan is sufficiently sized and shaped to require liquids to pass upwards primarily through the non-linear risers, and as long as the risers direct the mixture into the vapor space in a nonvertical and preferably horizontal direction. The scope of the invention is therefore intended to be limited only by the following claims.

We claim:

1. A reactor system for reacting a liquid petrochemical feedstock and a process gas to produce a polyphasic mixture of reacted feedstock and process gas, which comprises:

an elongated, vertically oriented reactor vessel having upper and lower ends and a reactor wall, the reactor vessel defining and substantially surrounding a liquid reactor region adjacent the lower end suitable for reacting a liquid petrochemical feedstock and a process gas to produce a polyphasic mixture of reacted feedstock and process gas, and the reactor vessel also defining and substantially surrounding a reactor vapor space adjacent the upper end;

a gas-liquid separator extending generally horizontally from the wall within the reactor vessel and comprising (a) recycle pan means located above the liquid reactor region and below the reactor vapor space, said pan means having a periphery circumferentially joined to the reactor vessel, and (b) non-linear riser means for directing the mixture from the liquid region through the recycle pan means and into the reactor vapor space to promote separation of the phases of the mixture, wherein the riser means consist of a plurality of non-linear risers which are located symmetrically around a reactor axis of radial symmetry, and wherein each of the non-linear risers includes a linear portion having a common intake elevation shared by the others of the non-linear risers and a curved portion, the linear portion being integral with the curved portion.

2. The reactor system of claim 1 wherein at least one of the curved portions forms an angle of between 45° to 135° with respect to the respective linear portion.

3. The reactor system of claim 1 wherein the non-linear riser means is oriented to direct exiting mixture tangentially toward the wall of the reactor vessel.

4. The reactor system of claim 1 wherein at least one of the curved portions forms a vertical angle of about 15° above or below a plane defined by a horizontal cross-section of the reactor vessel.

5. The reactor system of claim 1 wherein the plurality of risers include at least six risers, each oriented to direct reaction mixture tangentially toward the reactor vessel wall, and wherein each curved portion defines an angle of between 60° to 120° with respect to the respective linear portion.

6. The reactor of claim 1 wherein the riser means has a total cross-sectional area between 4 to 12 percent of a reactor cross-section through which the risers pass, and wherein the plurality of risers include at least four and no more than sixteen risers.

7. The reactor of claim 6 wherein the riser means has a total cross-sectional area between about 5 to 10 percent of a reactor cross-section through which the riser means pass.

8. The reactor system of claim 1 wherein each of the curved portions forms a horizontal angle of about 60 to 150 degrees with respect to a horizontal line passing through a riser vertical axis of symmetry of the respective riser and the reactor axis of radial symmetry.

9. The reactor system of claim 8 wherein each of the curved portions forms a horizontal angle of about 75 to 105 degrees with respective to the horizontal line passing through the riser vertical axis of symmetry of the respective riser and the reactor axis of radial symmetry.

* * * * *

UNITED STATES PATENT AND TRADEMARK OFFICE
CERTIFICATE OF CORRECTION

PATENT NO.: 5,624,642

DATED: April 29, 1997

INVENTOR(S): Narasimhan Devanathan, et al.

It is certified that error appears in the above-identified patent and that said Letters Patent is hereby corrected as shown below:

| Col. | Line | |
|------|------|---|
| 10 | 25 | "with respective to the horizontal line" should read<br>--with respect to the horizontal line-- |

Signed and Sealed this

Twelfth Day of August, 1997

Attest:

BRUCE LEHMAN

*Attesting Officer*  *Commissioner of Patents and Trademarks*